(12) United States Patent
Guillou et al.

(10) Patent No.: US 12,637,195 B2
(45) Date of Patent: May 26, 2026

(54) SYSTEM FOR THE THERMAL MANAGEMENT OF AN EXTERNAL ELECTRIC-POWER-GENERATING NACELLE EQUIPPING AN ELECTRICALLY POWERED AIRSHIP, NACELLE AND AIRSHIP EQUIPPED WITH SAID SYSTEM

(71) Applicant: Flying Whales, Suresnes (FR)

(72) Inventors: Pierrot Guillou, Suresnes (FR); Gilles Gregoire, Suresnes (FR); Olivier Desgeorges, Suresnes (FR)

(73) Assignee: Flying Whales, Suresnes (FR)

( * ) Notice: Subject to any disclaimer, the term of this patent is extended or adjusted under 35 U.S.C. 154(b) by 22 days.

(21) Appl. No.: 18/290,620

(22) PCT Filed: Jul. 21, 2022

(86) PCT No.: PCT/FR2022/051452
§ 371 (c)(1),
(2) Date: Jan. 19, 2024

(87) PCT Pub. No.: WO2023/002131
PCT Pub. Date: Jan. 26, 2023

(65) Prior Publication Data
US 2025/0083790 A1 Mar. 13, 2025

(30) Foreign Application Priority Data
Jul. 21, 2021 (FR) ....................................... 2107860

(51) Int. Cl.
*F01P 3/00* (2006.01)
*B64B 1/28* (2006.01)

(52) U.S. Cl.
CPC ..................................... *B64B 1/28* (2013.01)

(58) Field of Classification Search
CPC ................................. B64B 1/28; B64D 27/31
(Continued)

(56) References Cited

U.S. PATENT DOCUMENTS

2016/0258358 A1 9/2016 Kazlauskas et al.
2020/0362720 A1* 11/2020 Klemen ................. B64D 27/31

FOREIGN PATENT DOCUMENTS

CN 107416214 A 12/2017
EP 3056423 A1 8/2016
(Continued)

OTHER PUBLICATIONS

International Search Report for Application No. PCT/FR2022/051452 dated Oct. 28, 2022, 2 pages.
(Continued)

*Primary Examiner* — Davis D Hwu
(74) *Attorney, Agent, or Firm* — TraskBritt

(57) ABSTRACT
A system for the thermal management of an external electric-power-generating nacelle equipping an electrically powered airship, the nacelle comprising electrical generation means implementing at least one turbogenerator contained in a fire containment vessel and provided with an inlet duct for turbine feed air and a flue gas exhaust duct, the system comprising ventilation means for injecting external air into the fire containment vessel, and means for discharging the ventilation air from the fire containment vessel, the means surrounding the flue gas exhaust duct so as to provide a Venturi effect for the outflow energized by the turbine flue gases.

11 Claims, 7 Drawing Sheets

(58) Field of Classification Search
USPC .......................................................... 165/51
See application file for complete search history.

(56)                    References Cited

FOREIGN PATENT DOCUMENTS

WO              93/16280  A1      8/1993
WO        2003/037715  A1      5/2003

OTHER PUBLICATIONS

International Written Opinion for Application No. PCT/FR2022/
051452 dated Oct. 28, 2022, 5 pages.

* cited by examiner

SYSTEM FOR THE THERMAL MANAGEMENT OF AN EXTERNAL ELECTRIC-POWER-GENERATING NACELLE EQUIPPING AN ELECTRICALLY POWERED AIRSHIP, NACELLE AND AIRSHIP EQUIPPED WITH SAID SYSTEM

CROSS-REFERENCE TO RELATED APPLICATIONS

This application is a national phase entry under 35 U.S.C. § 371 of International Patent Application PCT/FR2022/051452, filed Jul. 21, 2022, designating the United States of America and published as International Patent Publication WO 2023/002131 A1 on Jan. 26, 2023, which claims the benefit under Article 8 of the Patent Cooperation Treaty of French Patent Application Serial No. FR2107860, filed Jul. 21, 2021.

TECHNICAL FIELD

The field of the disclosure is that of electrically powered rigid-structure airships, designed for the transport of heavy loads and, more particularly, that of cooling and ventilating electric-power-generating systems and associated auxiliary equipment on-board these airships.

BACKGROUND

Airships carrying heavy loads have the peculiarity, by virtue of their electronic flight system and their distributed or all-electric hybrid propulsion, of performing long stationary flights to carry out the change exchange, a specific difficulty appears. Indeed, in old airships, since the engines were directly connected to the propellers for propulsion, there was, therefore, always a flow of "cool" air allowing the discharge of heat energy via forced-pipe exchangers or by natural convection.

In electrically powered airships, since the turbines, and in the future the fuel cell stacks, are only used to produce the primary mechanical power that allows the electricity generator to produce the electricity necessary for powering the on-board equipment (propulsion, lift, flight-control system), this generator is not connected to a propeller. Despite the fact that it "sucks in" air to feed its thermodynamic cycle and thus to create a stream of cool air, it is highly unadvisable to implement this type of architecture for two main reasons:

Aviation regulations advise against introducing exchangers containing flammable fluids into the air inlet ducts of the turbine engine, since, in the event of leaks, as a result of an impact from ingested debris, for example, a leak could be ingested by the turbine engine and create an internal fire that could prove catastrophic for the integrity of the latter; and Turbines are very sensitive in terms of efficiency with respect to pressure losses of the air inlets and their exhaust. Introducing an exchanger into the air inlet duct of the turbine engine would, therefore, be extremely detrimental from the point of view of efficiency and overall performance of the primary power-generation system.

In order to deal with this issue, it is necessary to introduce novel solutions and architectures that allow the heat energy generated by the systems to be discharged into the external environment. Moreover, as it is necessary to contain complete turbogenerator systems in fire containment vessels in order to reduce the risk of a fire propagating across the entire nacelle incorporating these turbogenerators, it is necessary to treat the problem of cooling the entire turbogenerator system as a whole, beyond the conventional approaches adapted until now.

BRIEF SUMMARY

This aim is achieved with a system for the thermal management of an external electric-power-generating nacelle equipping an electrically powered airship, the nacelle comprising electrical generation means implementing at least one turbogenerator contained in a fire containment vessel and provided with an inlet duct for turbine feed air and a flue gas exhaust duct, this system comprising ventilation means for injecting external air into the fire containment vessel, and means for discharging the ventilation air from the containment vessel, the means for discharging the ventilation air surrounding the flue gas exhaust duct.

This particular arrangement of the means for discharging the ventilation air around the flue gas exhaust duct, as a second skin, has the effect of providing a Venturi effect that contributes to energizing the ventilation air and accelerating the exiting flow of a mixture of combustion gas and ventilation air.

When the thermal management system according to the disclosure is implemented with at least one turbogenerator equipped with a plenum chamber provided to homogenize the air around a suction grid equipping the feed air inlet duct, the containment vessel can then advantageously comprise a front cowl arranged upstream of the plenum chamber and a rear cowl arranged downstream of the plenum chamber.

The containment vessel may include a first firewall separating the front cowl from the plenum chamber and a second firewall separating the rear cowl from the plenum chamber.

The ventilation means may comprise a first duct for injecting air into the front cowl and at least one second duct for injecting air into the rear cowl.

The means for discharging ventilation air may comprise an exhaust duct having a height much greater than that of the flue gas exhaust duct and a diameter substantially greater than that of the flue gas exhaust duct.

The ventilation means can preferably be arranged to provide forced ventilation of the fire containment vessel.

According to another aspect of the disclosure, an external electric-power-generating nacelle is proposed equipping an electrically powered airship, comprising: (i) electrical generation means implementing at least one turbogenerator contained in a fire containment vessel and provided with an inlet duct for turbine feed air and a flue gas exhaust duct, and (ii) a thermal management system comprising ventilation means for injecting external air into the fire containment vessel, and means for discharging the ventilation air from the containment vessel, the means for discharging the ventilation air surrounding the flue gas exhaust duct.

According to yet another aspect of the disclosure, an electrically powered airship is proposed equipped with at least two external electric-power-generating nacelles according to the disclosure. This airship may be of the rigid-structure type, dedicated to the transport of heavy loads and to the vertical transfer (hovering) of these loads.

DETAILED DESCRIPTION

Figure 1:
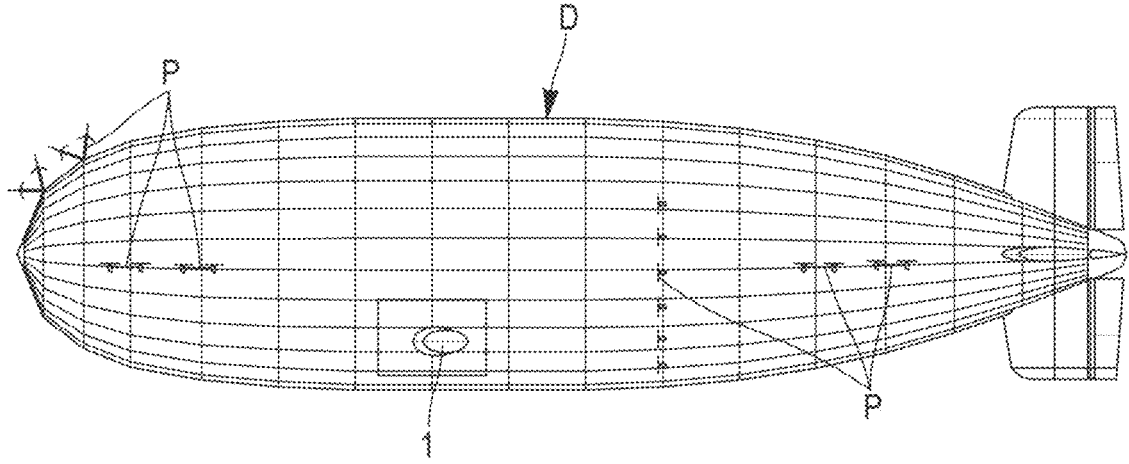
FIG. 1 depicts a side view of one embodiment of an airship equipped with two electric-power-generating nacelles.

With reference to FIG. 1, a rigid-structure airship D includes a set of propulsion units P supplied with electric power from electric-power-generating systems integrated into two external sponson-shaped nacelles 1 (only one of which is depicted in FIG. 1).

Figure 2:
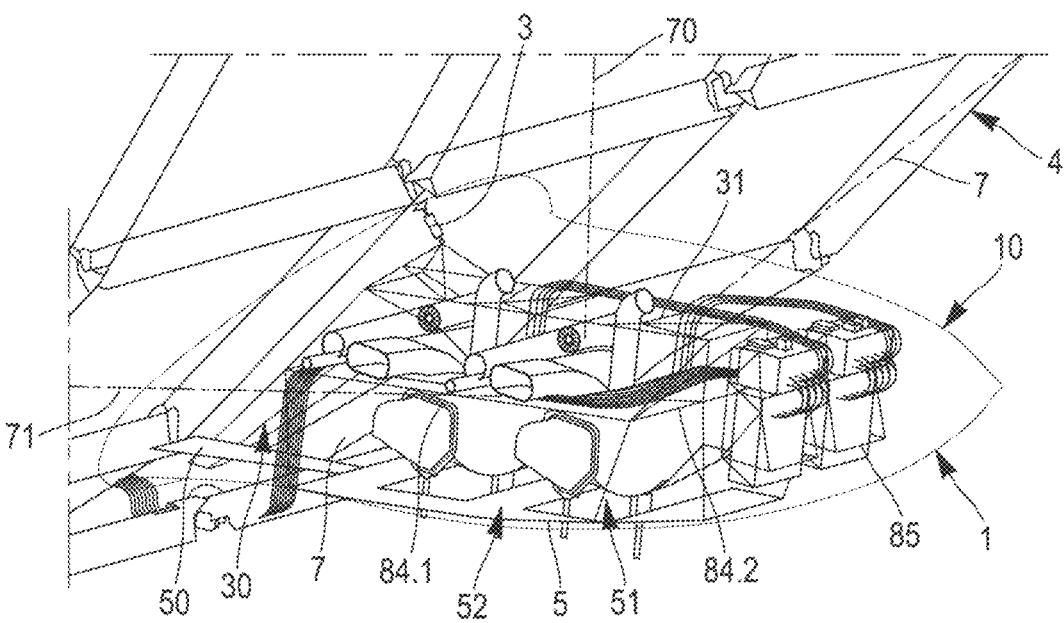
FIG. 2 is a perspective view of the inside of an electric-power-generating nacelle according to the disclosure.
Figure 3A:
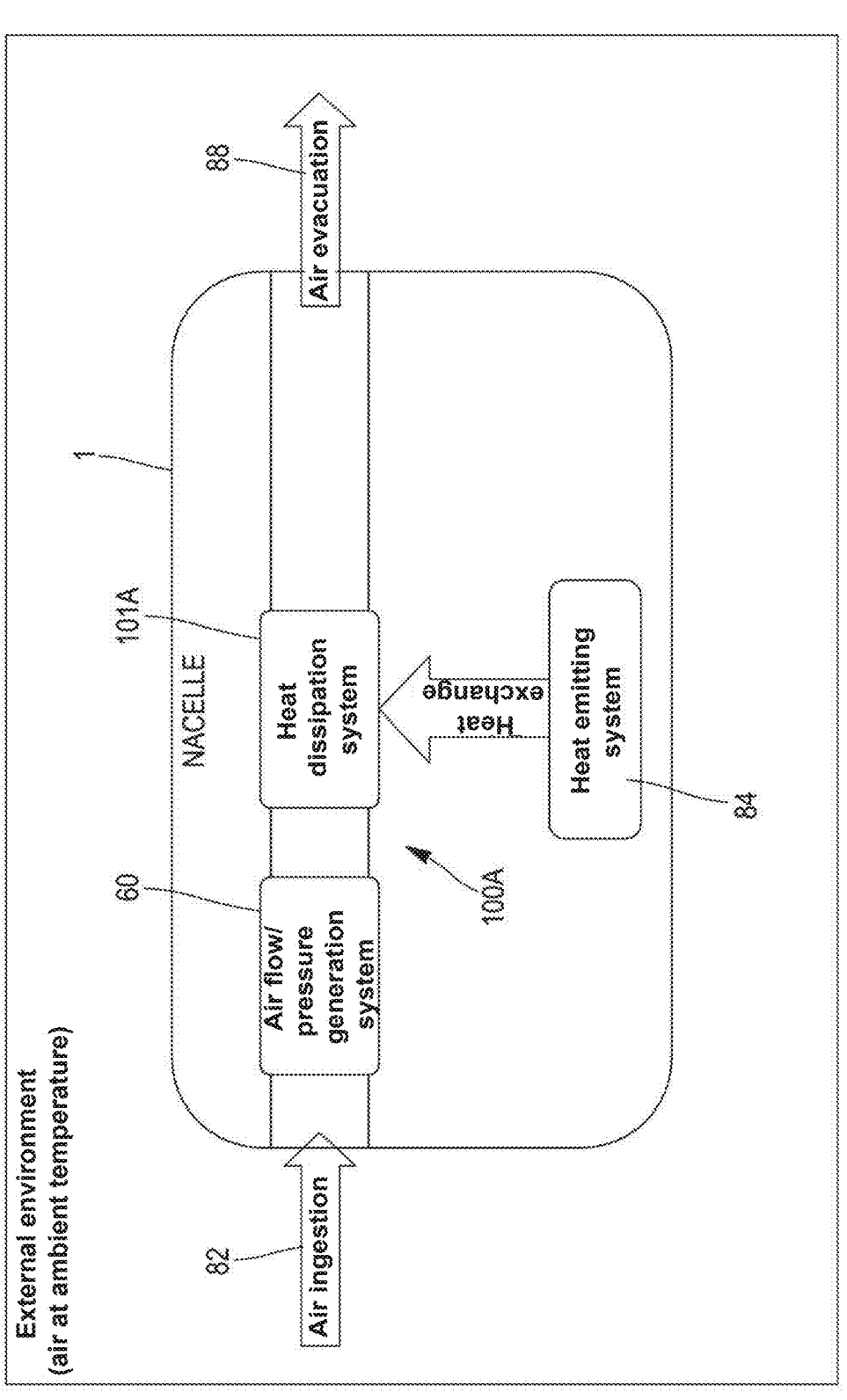
FIG. 3 illustrates four functional principles of ventilation and cooling that can be implemented in the context of the present disclosure.
Figure 3B:
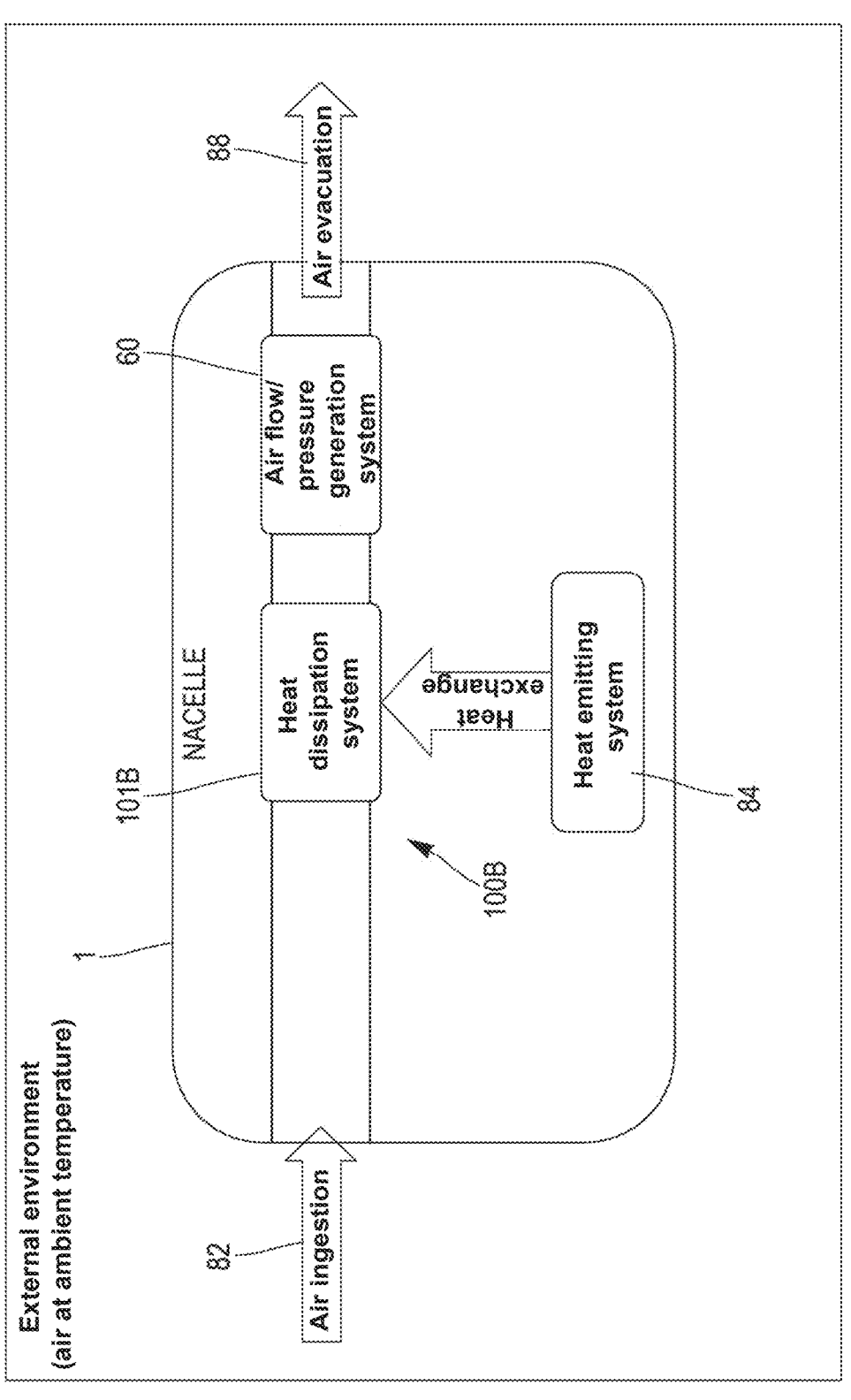
Figure 3C:
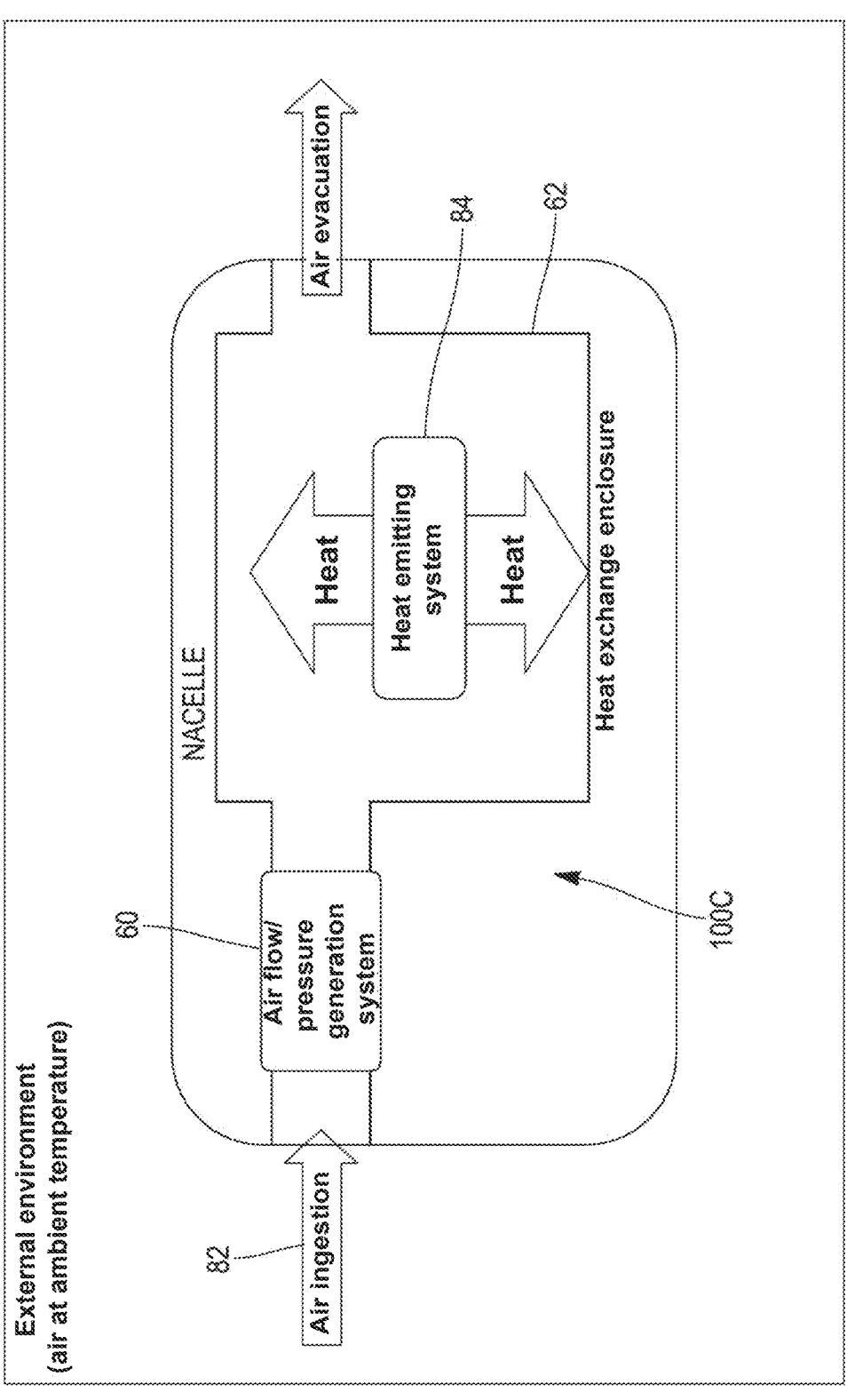
Figure 3D:
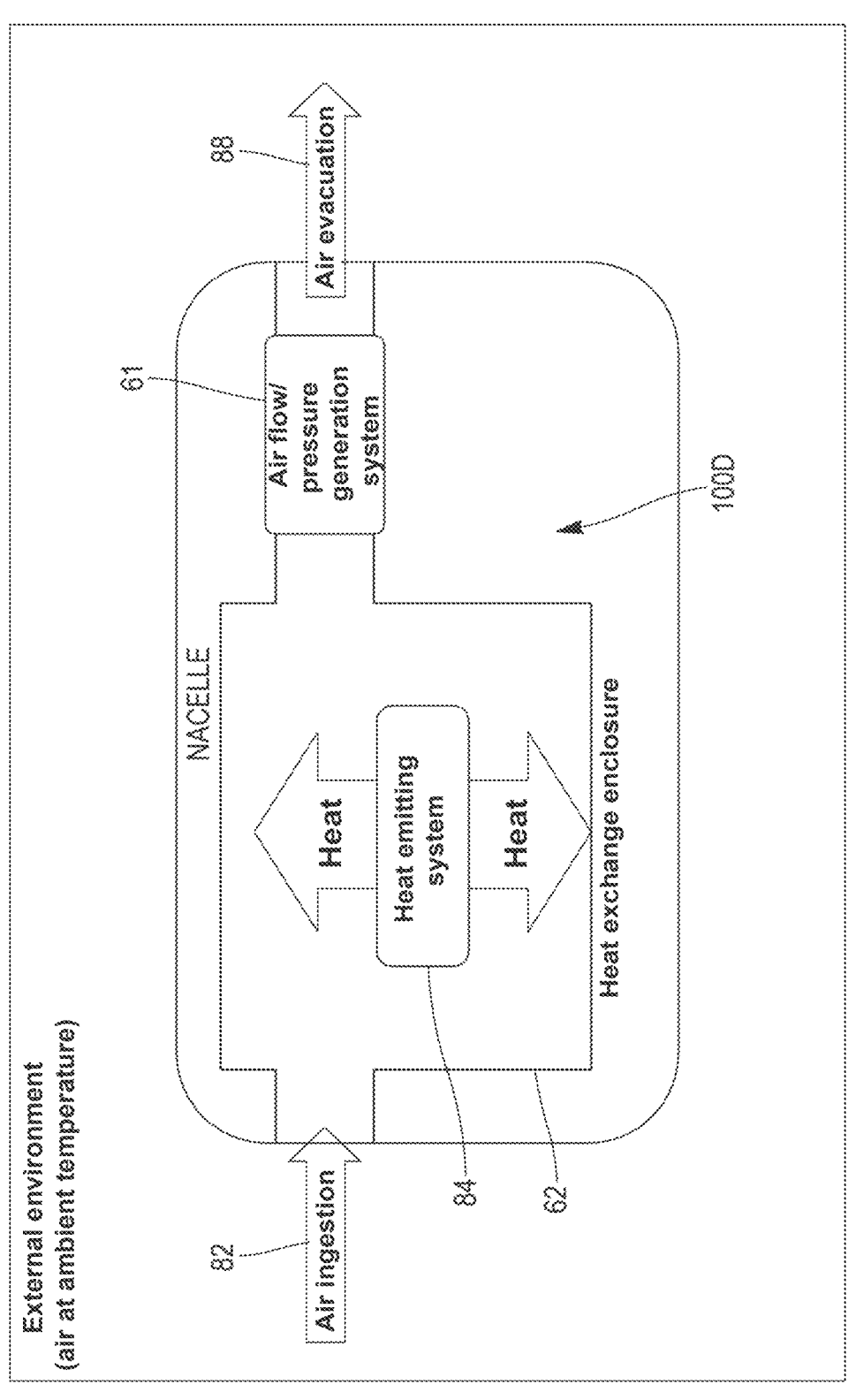

A sponson-shaped nacelle 1 comprises, referring to FIG. 2, a mechanical structure 30, 32 made from a lattice of beams made of composite material and covered with a shell or fairing skin 10. The upper portion 31 of the mechanical structure is connected to a frame 4 of the main body of the airship via a mechanical interface 3 and three cables 7, 70, 71.

The nacelle 1 incorporates two turbogenerator units 84.1, 84.2 mounted suspended from the upper portion 31 of the mechanical structure of the nacelle 1, a system of storage batteries 85, and a floor 5.

This floor 5 comprises an access path 50 for accessing the nacelle 1 from inside the airship D, and a floor portion 52 surrounding the two turbogenerators 84.1, 84.2. Recessed parts 51 are provided in the floor 5 to allow the turbogenerators to be deposited by means of winches provided on the upper portion 31 of the mechanical structure.

Four functional principles of ventilation and cooling that can be implemented in the context of a thermal management system according to the disclosure are described next referring to FIG. 3.

According to a first functional principle (A) corresponding to a forced exchange by overpressure upstream of the heat-energy or thermal exchange, the thermal management system 100A arranged within the nacelle 1 comprises a system 60 for generating air flow/pressure receiving cool air from an air inlet duct 82 and delivering pressurized air to the inlet of a thermal discharge system 101A intended to extract thermal energy from a heat-emitting system 84, in this case a turbogenerator or a fuel cell. The thermal discharge system 101A emits hot air that is discharged from the nacelle 1 via an outlet duct 88.

According to a second functional principle (B) corresponding to a forced exchange by negative pressure downstream of the heat-energy exchange, the thermal management system 100B arranged within the nacelle 1 comprises a thermal discharge system 101B coupled with a heat-emitting system 84 and receiving as input cool air from the outside via an air inlet duct 82. The hot air produced by the thermal discharge system 101B is injected at the inlet of a system 61 for generating air flow/negative pressure, which delivers hot exhaust air to the outside of the nacelle 1 via an outlet duct 88.

According to a third functional principle (C) corresponding to a natural convection exchange by generating a flow upstream of the heat-energy or thermal exchange vessel, the thermal management system 100C comprises a system 60 for generating the air flow/pressure injecting cool air under pressure into a thermal exchange vessel 62 encompassing a heat-emitting system 84 such as a turbogenerator or a fuel cell. The thermal energy emitted by this heat-emitting system 84 is discharged from the thermal exchange vessel 62 into the air ejected from this vessel to the outside of the nacelle 1 via an air outlet duct 88.

According to a fourth functional principle (D) corresponding to a natural convection exchange by generating a flow downstream of the heat-energy or thermal exchange vessel, the thermal management system 100D comprises a thermal exchange vessel 62 containing a heat-emitting system 84, such as a turbogenerator or a fuel cell, and receiving cool air at the inlet via an air inlet duct 82 and injecting hot air coming from the thermal exchange into a system 61 for generating air flow/pressure delivering hot air to the outside via an outlet duct 88.

Figure 4:
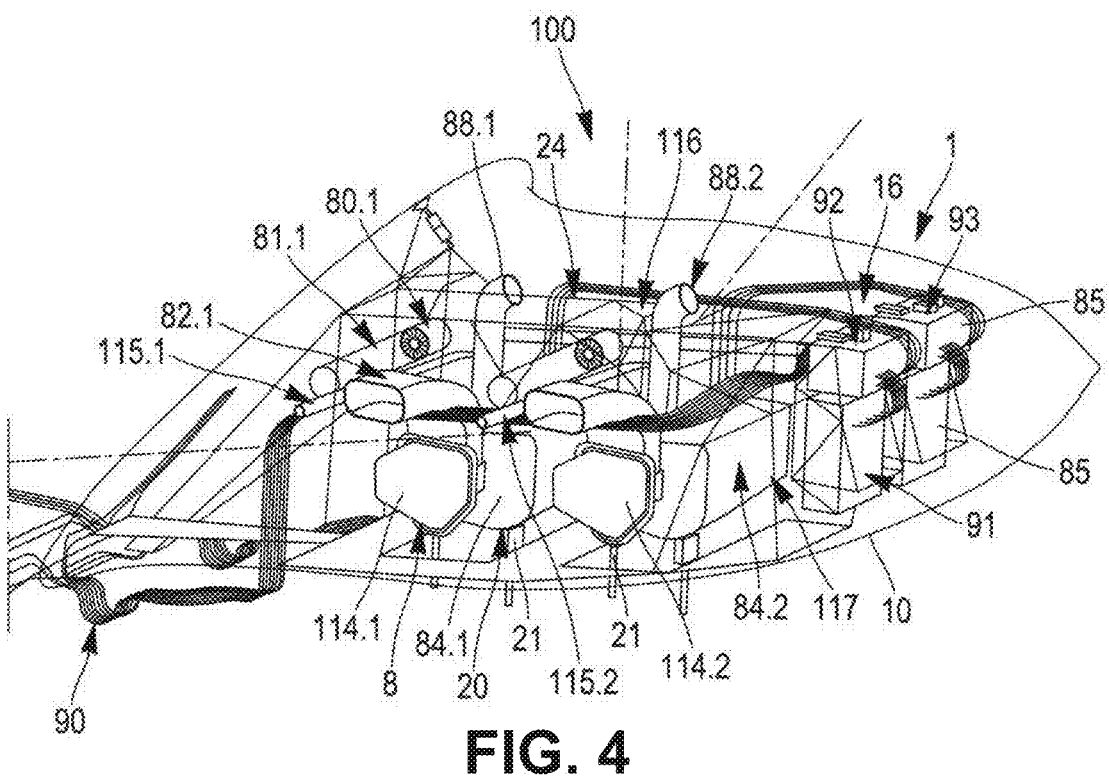
FIG. 4 is a perspective view of one embodiment of a thermal management system according to the disclosure implemented in an electric-power-generating nacelle according to the disclosure.
Figure 5:
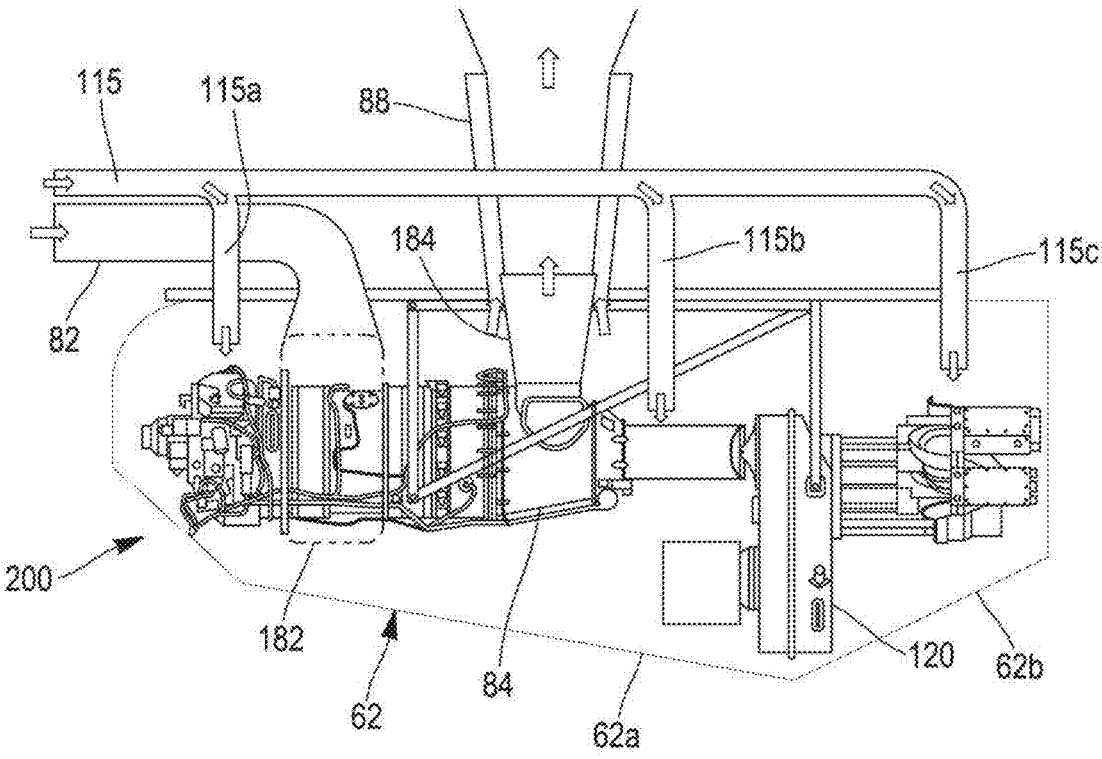
FIG. 5 is a schematic cross-sectional view of a thermal management system according to the disclosure.
Figure 6:
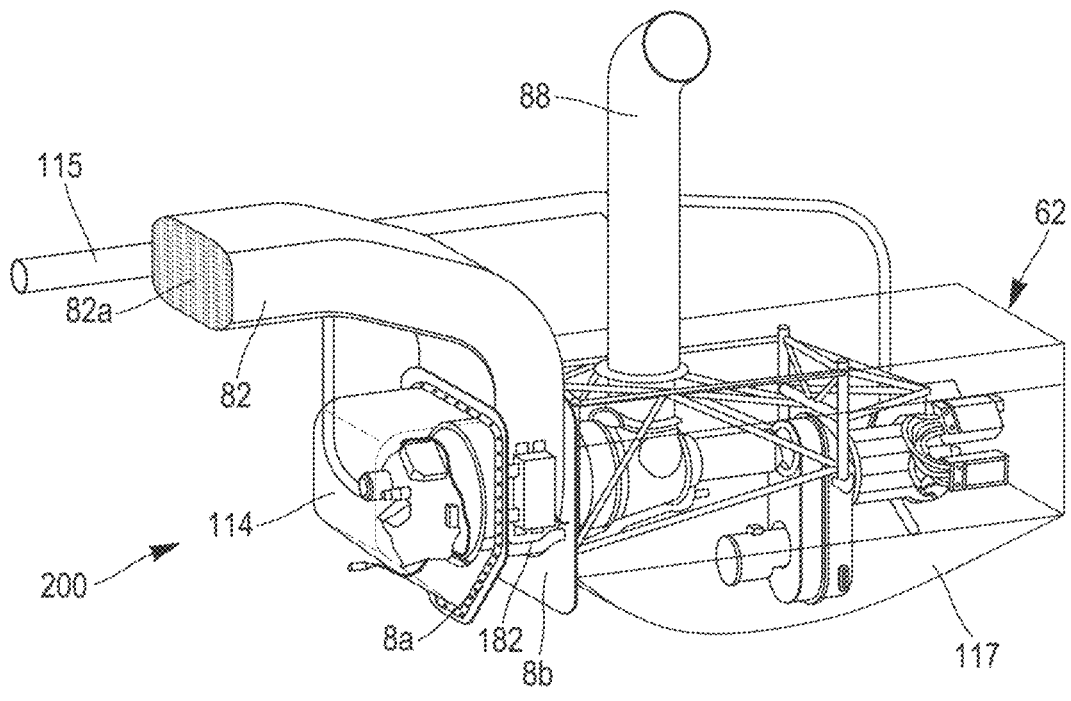
FIG. 6 illustrates a perspective view of the thermal management system of FIG. 5.

One exemplary embodiment of a thermal management system according to the disclosure, corresponding to the third functional principle (C) previously described, implemented in a nacelle integrating two turbogenerators and an NPES high-voltage generator 20, is described hereunder referring to FIGS. 4 to 6.

The nacelle 1 comprises two turbogenerators 84.1, 84.2 connected at the inlet to a fuel supply line 24 and at the outlet to an energy conversion system 85, to a system of storage batteries 92 and to a high-voltage electrical supply bus 90 extending within the airship D to supply the electrical propulsion systems.

The thermal management system 100 equipping the nacelle 1 integrating the two turbogenerators 84.1, 84.2, comprises:

two turbine-cooling air inlet ducts 81.1, 81.2 integrated in the turbogenerators 84.1, 84.2;

two turbine-cooling fans 80.1, 80.2, arranged downstream of the two air inlet ducts 81.1, 81.2;

two thermal exchangers 116 coupled with the two turbogenerators 84.1, 84.4;

two air inlet ducts 115.1, 115.2 provided for cooling the front cowl enclosures 114.1, 114.2 of the turbogenerators 84.1, 84.2;

two plenum chambers 82.1, 82.2 connected to the two air inlet ducts 115.1, 115.2 for cooling the front cowls 114.1, 114.2;

two air and flue gas exhaust ducts 88.1, 88.2, of the "eductor" type.

One practical example of an embodiment of a thermal management system 200 according to the disclosure is described below referring to FIGS. 5 and 6, implemented for cooling a turbogenerator 84 equipped with a gearbox 120 and included in a fire containment vessel 62. This fire containment vessel 62 includes a fuel drainage bottom configured, for example, according to two slopes 62a, 62b. The thermal management system 200 comprises an engine air inlet duct 82 opening into a plenum chamber 182 surrounding a part of the turbine of the turbogenerator 84 and a ventilation air inlet duct 115 for the inlet of pressurized ventilation air into the containment vessel 62. The provided plenum chamber 182 is provided to homogenize the air around a suction grid equipping the feed air inlet duct.

Referring to FIG. 6, the containment vessel 62 comprises a front cowl 114 covering the upstream stage of the turbine and a rear cowl 117 covering the downstream stage of the turbine and the gearbox 120. The ventilation air inlet duct 115 supplies a first duct 115a for injecting air into the front cowl 114, and second and third ducts 115b, 115c for injecting air into the rear cowl 117. The front and rear cowls 114, 117, respectively, are each separated from the plenum chamber 182 by a firewall 8a, 8b.

The thermal management system 200 further comprises an outlet duct 88 for discharging air coming from the containment vessel 62, which surrounds the flue gas exhaust duct 184 for discharging flue gases coming from the turbine. This exhaust duct 88 has a height much greater than that of the flue gas exhaust duct and a diameter substantially greater than that of this flue gas exhaust duct, so that this geometric configuration contributes to creating a Venturi effect applied to the exiting flow of ventilation air mixed with the combustion gas.

Of course, other embodiments of a thermal management system can be envisaged without departing from the scope of the present disclosure. In particular, other geometries of fire containment vessels can be envisaged. The configuration of the ventilation air injection circuit can vary, especially as regards the number of ducts for injecting air into the fire containment vessel.

The invention claimed is:

1. A thermal management system for thermal management of an external electric-power-generating nacelle of an electrically powered airship, the nacelle comprising at least one turbogenerator disposed within a fire containment vessel, the thermal management system comprising:
   an air inlet duct configured to feed air to a turbine of the at least one turbogenerator;
   a flue gas exhaust duct configured to discharge flue gases coming from the turbine;
   a ventilation air inlet duct configured to feed external air into the fire containment vessel; and
   an outlet duct configured to discharge ventilation air from the fire containment vessel, the outlet duct surrounding the flue gas exhaust duct.

2. The thermal management system of claim 1, wherein a plenum chamber surrounds a part of the at least one turbogenerator, wherein the air inlet duct opens into the plenum chamber, and wherein the fire containment vessel comprises a front cowl arranged upstream of the plenum chamber and a rear cowl arranged downstream of the plenum chamber.

3. The thermal management system of claim 2, wherein the fire containment vessel comprises a first firewall separating the front cowl from the plenum chamber and a second firewall separating the rear cowl from the plenum chamber.

4. The thermal management system of claim 2, wherein the ventilation air inlet duct comprises a first duct for injecting air into the front cowl and at least one second duct for injecting air into the rear cowl.

5. The thermal management system of claim 1, wherein the outlet duct has a height substantially greater than that of the flue gas exhaust duct and a diameter substantially greater than that of the flue gas exhaust duct.

6. The thermal management system of claim 1, wherein the ventilation air inlet duct provides forced ventilation of the fire containment vessel.

7. An external electric-power-generating nacelle equipping an electrically powered airship, the nacelle comprising:
   a fire containment vessel;
   at least one turbogenerator disposed within the fire containment vessel;
   an air inlet duct configured to supply turbine feed air to the at least one turbogenerator;
   a flue gas exhaust duct configured to discharge flue gases coming from the at least one turbogenerator; and
   a thermal management system comprising:
      a ventilation air inlet duct for injecting external air into the fire containment vessel, and
      an outlet duct for discharging ventilation air from the fire containment vessel, the outlet duct surrounding the flue gas exhaust duct.

8. The nacelle of claim 7, further comprising a plenum chamber surrounding a part of the at least one turbogenerator, the inlet duct for turbine feed air opening into the plenum chamber, wherein the fire containment vessel comprises a front cowl arranged upstream of the plenum chamber and a rear cowl arranged downstream of the plenum chamber.

9. The nacelle of claim 8, wherein the fire containment vessel comprises a first firewall separating the front cowl from the plenum chamber and a second firewall separating the rear cowl from the plenum chamber.

10. An electrically powered airship equipped with at least two external electric-power-generating nacelles according to claim 7.

11. The electrically powered airship of claim 10, wherein the airship has a rigid structure, and wherein the airship is configured for transporting heavy loads and for vertical transfer of the heavy loads.

* * * * *